United States Patent
Sierra et al.

(10) Patent No.: US 10,337,282 B2
(45) Date of Patent: Jul. 2, 2019

(54) METHODS AND COMPOSITIONS FOR REDUCING WATER PRODUCTION IN FRACTURES OR VOIDS IN SUBTERRANEAN FORMATIONS

(71) Applicant: Halliburton Energy Services, Inc., Houston, TX (US)

(72) Inventors: Jose R. Sierra, Mexico City (MX); Julio E. Vasquez, Richmond, TX (US); Victor Daniel Escobar, Villahermosa (MX); Victor Manuel Cancino, Villahermosa (MX); Larry Steven Eoff, Porter, TX (US); Cristian R. Ramirez, Monterrey (MX)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/546,933

(22) PCT Filed: Mar. 26, 2015

(86) PCT No.: PCT/US2015/022718
§ 371 (c)(1),
(2) Date: Jul. 27, 2017

(87) PCT Pub. No.: WO2016/153519
PCT Pub. Date: Sep. 29, 2016

(65) Prior Publication Data
US 2018/0022982 A1  Jan. 25, 2018

(51) Int. Cl.
*E21B 33/138* (2006.01)
*C09K 8/035* (2006.01)
(Continued)

(52) U.S. Cl.
CPC ........... *E21B 33/138* (2013.01); *C09K 8/035* (2013.01); *C09K 8/508* (2013.01); *C09K 8/5045* (2013.01);
(Continued)

(58) Field of Classification Search
None
See application file for complete search history.

(56) References Cited

U.S. PATENT DOCUMENTS

| 4,463,808 A | 8/1984 | Mason et al. |
| 6,109,350 A | 8/2000 | Nguyen et al. |

(Continued)

FOREIGN PATENT DOCUMENTS

WO  2011/019989 A2  2/2011

OTHER PUBLICATIONS

International Search Report and Written Opinion issued in related PCT Application No. PCT/US2015/022718 dated Dec. 22, 2015, 12 pages.

(Continued)

*Primary Examiner* — Andrew Sue-Ako
(74) *Attorney, Agent, or Firm* — Thomas Rooney; Baker Botts L.L.P.

(57) ABSTRACT

Systems, compositions, and methods for reducing the production of water in subterranean formations having fractures or voids therein are provided. In one embodiment, the methods comprise: introducing a particulate material into a portion of a subterranean formation comprising one or more fractures or voids; and introducing a treatment fluid comprising a relative permeability modifier into the portion of the subterranean formation such that the permeability of the particulate material in the portion of the subterranean formation to water is reduced.

12 Claims, 3 Drawing Sheets

(51) Int. Cl.
   E21B 43/267   (2006.01)
   C09K 8/66     (2006.01)
   C09K 8/504    (2006.01)
   C09K 8/508    (2006.01)
   C09K 8/57     (2006.01)
   C09K 8/575    (2006.01)
   E21B 43/25    (2006.01)
   E21B 43/26    (2006.01)

(52) U.S. Cl.
   CPC ............ *C09K 8/572* (2013.01); *C09K 8/5751* (2013.01); *C09K 8/665* (2013.01); *E21B 43/267* (2013.01); *E21B 43/25* (2013.01); *E21B 43/26* (2013.01)

(56) References Cited

U.S. PATENT DOCUMENTS

| | | | |
|---|---|---|---|
| 6,476,169 B1 | 11/2002 | Eoff et al. | |
| 2004/0177957 A1* | 9/2004 | Kalfayan | C09K 8/5083 166/270 |
| 2005/0011678 A1* | 1/2005 | Akinlade | E21B 21/003 175/72 |
| 2007/0284106 A1* | 12/2007 | Kalman | E21B 34/02 166/298 |
| 2008/0110624 A1 | 5/2008 | Nguyen et al. | |
| 2008/0318812 A1* | 12/2008 | Kakadjian, Sr. | C09K 8/035 507/221 |
| 2009/0275489 A1 | 11/2009 | Kilaas et al. | |
| 2011/0098377 A1 | 4/2011 | Huang et al. | |
| 2011/0220359 A1* | 9/2011 | Soliman | C09K 8/588 166/305.1 |
| 2012/0267098 A1* | 10/2012 | Peirce | E21B 33/138 166/277 |
| 2012/0279704 A1* | 11/2012 | Eoff | C09K 8/5751 166/280.2 |

OTHER PUBLICATIONS

Fry, Leonard Eugene, et al. "Successful application of relative-permeability modifiers to control water production in Rose Run fracturing." SPE Eastern Regional Meeting. Society of Petroleum Engineers, 2006.

Curtice, Richard James, Carl Carlson, and Michael Eric Stahl. "Relative-Permeability Modifiers Used in Conjunction With Hydraulic Fracturing Can Increase Hydrocarbon Production and Reduce Water Production." SPE Eastern Regional/AAPG Eastern Section Joint Meeting. Society of Petroleum Engineers, 2008.

Vasquez, Julio, and Larry Eoff. "A Relative Permeability Modifier for Water Control: Candidate Selection, Case Histories, and Lessons Learned after more than 3,000 Well Interventions." SPE European Formation Damage Conference & Exhibition. Society of Petroleum Engineers, 2013.

Dalrymple, Eldon Dwyann, and Omkar A. Jaripatke. "Relative permeability modifiers in fracture stimulation applications." SPE Middle East Oil and Gas Show and Conference. Society of Petroleum Engineers, 2009.

Soriano, J. Eduardo, et al. "Relative-Permeability Modifiers and Their Use in Acid Stimulation in HP/HT Low-Permeability Carbonate Formations: Offshore Mexico Cases." Latin American & Caribbean Petroleum Engineering Conference. Society of Petroleum Engineers, 2007.

"Guidon AGS Service" Brochure H03536, Halliburton Energy Services, Sep. 2005, 2 pages.

"WaterWeb Service" Brochure H03706, Halliburton Energy Services, Apr. 2014, 2 pages.

"CW-Frac Service" Brochure H08970, Halliburton Energy Services, May 2008, 2 pages.

"AquaCon Relative Permeability Modifier" Brochure, Baker Hughes Incorporated, 2012, 8 pages.

International Preliminary Report on Patentability issued in related PCT Application No. PCT/US2015/022718, dated Oct. 5, 2017, 8 pages.

\* cited by examiner

METHODS AND COMPOSITIONS FOR REDUCING WATER PRODUCTION IN FRACTURES OR VOIDS IN SUBTERRANEAN FORMATIONS

CROSS-REFERENCE TO RELATED APPLICATION

The present application is a U.S. National Stage Application of International Application No. PCT/US2015/022718 filed Mar. 26, 2015, which is incorporated herein by reference in its entirety for all purposes.

BACKGROUND

The present disclosure relates to systems, compositions, and methods for treating subterranean formations.

The unwanted production of water, including brine, from hydrocarbon-producing wells constitutes a considerable technical problem and expense in oilfield operations. When a subterranean formation contains water in significant amounts (e.g., aquifers) and/or where water is injected into the formation in order to improve the hydrocarbon recovery, the higher mobility of the water often allows it to flow to the well bore by way of natural and manmade fractures and high permeability streaks. If the ratio of recovered water to recovered hydrocarbons becomes sufficiently large, the cost of separating the water from the hydrocarbons and disposing of it can become a barrier to continued production. This can lead to abandonment of a well penetrating a subterranean formation, even when significant amounts of hydrocarbons remain therein.

In order to reduce the undesired production of water from hydrocarbon-producing subterranean formations, aqueous-soluble polymer systems containing crosslinking agents have been used in the art to enter water-containing zones of the formation and block the flow of water therefrom. Selective placement of these crosslinked polymers in a subterranean formation and stability therein represent significant technical challenges that have somewhat limited their use. A more recent strategy to reduce water production from a subterranean formation has been to use agents known as relative permeability modifiers (RPMs). Such RPMs are capable of significantly reducing the flow of water within a subterranean formation while having a minimal effect on the flow of hydrocarbons. The use of RPMs does not generally necessitate the use of zonal isolation techniques that are often employed with crosslinked polymers.

While RPMs can overcome the necessity for selective placement in a subterranean formation, it may still prove advantageous to place RPMs in a desired zone of a subterranean formation in order to more efficiently focus their effects therein. For example, typical uses of RPMs involve injecting a fluid carrying the RPM into the matrix of the rock formation. However, certain regions of a formation often contain one or more fractures or voids, which may be naturally-occurring and/or may be created or enhanced in the course of one or more subterranean operations (e.g., fracturing, acidizing, drilling, etc.). In such regions, there may be insufficient rock matrix into which to place the RPM, and thus those regions may remain susceptible to unwanted production of water despite having been exposed to an RPM.

BRIEF DESCRIPTION OF THE DRAWINGS

These drawings illustrate certain aspects of some of the embodiments of the present disclosure, and should not be used to limit or define the claims.

Figure 1:
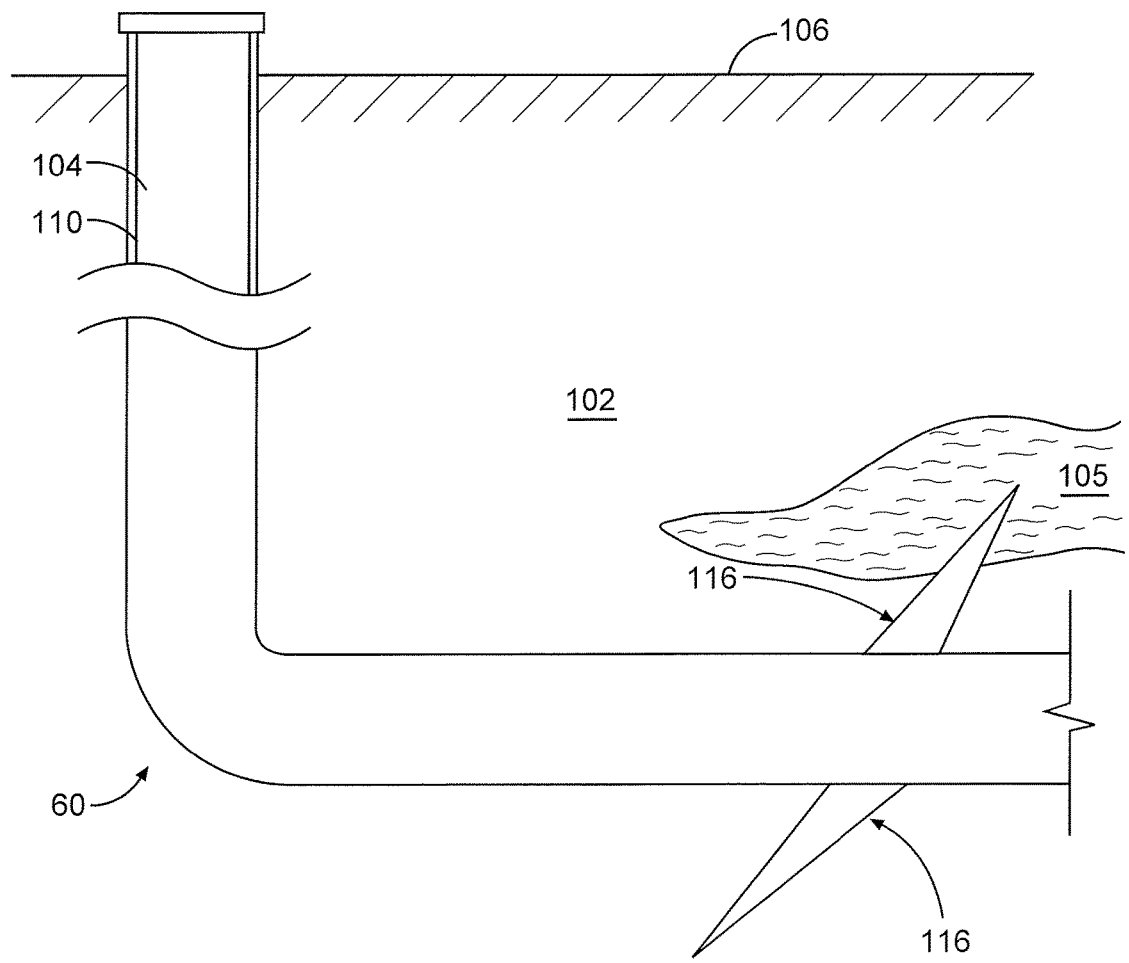
FIG. 1 is a diagram illustrating a well in a portion of a subterranean formation according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

The present disclosure relates to systems, compositions, and methods for treating subterranean formations. More particularly, the present disclosure relates to systems, compositions, and methods for reducing the production of water in subterranean formations having fractures or voids therein.

The methods of the present disclosure generally comprise introducing a particulate material into a portion of a subterranean formation comprising one or more fractures or voids, and introducing a treatment fluid comprising a relative permeability modifier into the portion of the subterranean formation such that the permeability of the particulate material in the portion of the subterranean formation to water is reduced. Without limiting the claims or application of the methods of the present disclosure, it is believed that the relative permeability modifier at least partially adsorbs onto at least a portion of the particulate material to achieve this result. In certain embodiments, the particulate material may be deposited in at least one of the fractures or voids in the formation, and may form an artificial rock matrix within the fracture(s) or void(s) (which may form before or after the relative permeability modifier is introduced into the formation). In certain embodiments, these methods may be applied in permeable regions of a formation (e.g., highly fractured formations, unintentionally fractured formations, etc.) among other reasons, to reduce the production of water therein. The permeability of such an artificial rock matrix formed by the particulate material may be sufficiently low to allow one or more relative permeability modifiers to be effective reducing the flow and/or production of water therein. In many such embodiments, the pore spaces within such an artificial rock matrix may be larger than those of the naturally-occurring rock matrix in the formation, and thus the artificial rock matrix still may be more permeable than the surrounding formation. However in some embodiments, the permeability of the artificial rock matrix may approximate the permeability of the rock matrix of the surrounding formation. In certain embodiments, the methods and/or compositions of the present disclosure may be applied as a remedial treatment, i.e., to a region where water is already being produced. In other embodiments, the methods and/or compositions of the present disclosure may be applied as a preventative treatment, i.e., to a region where production of water may be expected or anticipated but has not yet occurred.

Among the many potential advantages to the methods, compositions, and systems of the present disclosure, only some of which are alluded to herein, the methods, compositions, and systems of the present disclosure may more effectively reduce and/or prevent the undesired production of water from highly permeable regions of certain subterranean formations such as fractures and/or voids where conventional uses of relative permeability modifiers may have been less effective. In certain embodiments, the methods, compositions, and systems of the present disclosure may be used to selectively control the flow and/or production of water or other aqueous fluids from a particular region of a subterranean formation while not obstructing the flow of hydrocarbons and/or other non-aqueous fluids from or through that same region.

The particulate material used in the methods, compositions, and systems of the present disclosure may comprise any particulate material (i.e., materials comprised of discrete, separate particles) known in the art that is suitable for use in subterranean formations. Generally, the particulate material should comprise a material onto which the relative permeability modifier can adsorb. In certain embodiments, if the relative permeability modifier in a particular embodiment of the present disclosure comprises a cationic compound, the particulate material in that embodiment may comprise a material that is generally anionic in nature, among other reasons, to facilitate the adsorption of the relative permeability modifier onto the surface of the particulate material.

Examples of particulate materials that may be suitable for use in certain embodiments of the present disclosure include, but are not limited to, clay, sand, bauxite, ceramic materials, glass materials, polymer materials, Teflon® materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. In certain embodiments, the particulate material used in the present disclosure may comprise a mixture of sand and clay materials. The particulate size generally may range from about 2 mesh to about 400 mesh on the U.S. Sieve Series; however, in certain circumstances, other sizes may be desired and will be entirely suitable for practice of the present disclosures. In particular embodiments, preferred particulates size distribution ranges are one or more of 6/12, 8/16, 12/20, 16/30, 20/40, 30/50, 40/60, 40/70, or 50/70 mesh. In certain embodiments, the particulate materials of the present disclosure may comprise particulates of a size up to about 40/60 mesh. It should be understood that the term "particulate," as used in this disclosure, includes all known shapes of materials, including substantially spherical materials, fibrous materials, polygonal materials (such as cubic materials), and mixtures thereof. In certain embodiments, the particulates included in the treatment fluids of some embodiments of the present disclosure may be coated with any suitable resin or tackifying agent known to those of ordinary skill in the art. As described below, in certain embodiments, the particulate material may be provided in a particular application of the present disclosure as a component of a treatment fluid (e.g., a slurry) that is pumped or injected into at least a portion of a subterranean formation. In such embodiments, the particulate material may be carried in the treatment fluid in any concentration or amount in which it may be suspended and carried in the fluid.

The relative permeability modifier (RPM) used in the methods, compositions, and systems of the present disclosure may comprise any RPM known in the art that is suitable for use in subterranean formations. In some embodiments, the relative permeability modifier may comprise a hydrophobically modified hydrophilic polymer. In some embodiments, the relative permeability modifier may comprise a hydrophilically modified hydrophilic polymer. In some embodiments, the relative permeability modifier may comprise at least one hydrophilic monomer and at least one hydrophobically modified hydrophilic polymer. In certain embodiments, the hydrophobically modified hydrophilic polymer also may comprise at least one cationic modification, and thus may carry a cationic charge. Illustrative examples of several types of relative permeability modifiers are provided below. In other embodiments, the relative permeability modifier may comprise un-modified hydrophilic polymers such as polyacrylamide or any of the other hydrophilic polymers described below.

In certain embodiments, hydrophobically modified hydrophilic polymers suitable for use in the present methods may include a plurality of hydrophilic monomers, at least a portion of which further comprise a hydrophobic modification thereon. In at least certain embodiments, hydrophobically modified hydrophilic polymers may therefore be considered to be a copolymer of hydrophilic monomers and hydrophobically modified hydrophilic monomers. Positioning of the monomers relative to one another in such copolymers may vary without limitation and may be, for example, alternating, random, block, or any combination thereof. Non-limiting examples of suitable hydrophilic monomers that may be present in hydrophobically modified hydrophilic polymers include, for instance, 2-acrylamido-2-methyl propane sulfonic acid, N,N-dimethylacrylamide, vinyl pyrrolidone, dimethylaminoethyl methacrylate, dimethylaminoethyl methacrylamide, acrylic acid, methacrylic acid, dimethylaminopropyl methacrylate, dimethylaminopropyl methacrylamide, trimethylammoniumethyl methacrylate halide (halide=chloride, bromide, iodide or a halide equivalent such as, for example, a tosylate or methanesulfonate), methacrylamide, hydroxyethyl acrylate, acrylamide, and the like. Hydrophobic modification of these hydrophilic monomers may comprise an alkyl substitution at a reactive site on the hydrophilic monomer. Non-limiting examples of hydrophobically modified hydrophilic monomers may include, for instance, alkyl acrylates, alkyl methacrylates, alkyl acrylamides, alkyl methacrylamides, alkyldimethylammoniumethyl methacrylate bromide, alkyldimethylammoniumethyl methacrylate chloride, alkyldimethylammoniumethyl methacrylate iodide, alkyldimethylammoniumpropyl methacrylate bromide, alkyl dimethylammoniumpropyl methacrylate chloride, alkyldimethylammoniumpropyl methacrylate iodide, alkyl dimethylammoniumethyl methacrylamide bromide, dimethylammoniumethyl methacrylamide chloride, dimethylammoniumethyl methacrylamide iodide, dimethylammoniumpropyl methacrylamide bromide, dimethylammoniumpropyl methacrylamide chloride, dimethylammoniumpropyl methacrylamide iodide, any combination thereof, and the like. In certain embodiments, the alkyl group of the hydrophobically modified hydrophilic monomers may comprise about 4 to about 30 carbon atoms. In certain embodiments, the alkyl group of the hydrophobically modified hydrophilic monomers may comprise about 4 to about 22 carbon atoms.

In some or other embodiments, hydrophobically modified hydrophilic polymers may comprise a copolymer of a hydrophilic polymer and a plurality of hydrophobically modified hydrophilic monomers. Suitable hydrophobically modified hydrophilic monomers may include, but are not limited to, those set forth above. Examples of suitable hydrophilic polymers may include, for instance, poly(vinyl alcohol), polyethyleneimine, polyvinylamine, poly(vinylamine/vinyl alcohol), poly(vinyl pyrrolidone), chitosan, cellulose, cellulose derivatives, acrylate polymers (e.g., poly(dimethylaminoethyl methacrylate), poly(dimethylaminopropyl methacrylamide), poly(acrylamide/dimethylamino ethyl methacrylate), poly(acrylamide/dimethylaminopropyl methacrylamide), poly(acrylic acid/dimethylaminoethyl methacrylate), and the like), polylysine, and the like.

In certain embodiments, the relative permeability modifier may comprise a hydrophobically modified compound that is characterized as the reaction product of a hydrophilic reactive polymer (e.g., a polymer containing reactive amino groups in the polymer backbone or as pendant groups) and a hydrophobic compound (e.g., an alkyl halide, the alkyl group in which may comprise from about 4 to about 30 carbon atoms, or in some embodiments, from about 4 to about 22 carbon atoms). Such relative permeability modifiers may be formed via synthesis or reaction prior to their introduction into a subterranean formation, or may be formed by an in situ reaction between a hydrophilic polymer and a hydrophobic compound.

Hydrophobically modified hydrophilic polymers may be prepared by any method. In some embodiments, hydrophobically modified hydrophilic polymers may be prepared by copolymerization of a hydrophilic monomer and a hydrophobically modified hydrophilic monomer. In some embodiments, hydrophobically modified hydrophilic polymers may be prepared by reacting a hydrophilic polymer with a hydrophobic group. In some embodiments, hydrophobically modified hydrophilic polymers may be prepared by reacting a hydrophilic polymer with a hydrophobically modified hydrophilic monomer. In some embodiments, hydrophobically modified hydrophilic polymers may be prepared by reacting a hydrophilic polymer with a hydrophilic monomer and thereafter reacting the hydrophilic monomer with a hydrophobic group. In some embodiments, hydrophobically modified hydrophilic polymers suitable for use in the present methods may have molecular weights ranging between about 100,000 and about 10,000,000, and the molar fraction of the hydrophobically modified monomer(s) may range from about 0.1% to about 50% of the hydrophobically modified hydrophilic polymer, or alternatively, from about 0.1% to about 10% of the hydrophobically modified hydrophilic polymer.

In some embodiments, hydrophilically modified hydrophilic polymers suitable for use in the present methods may include a plurality of hydrophilic monomers, at least a portion of which further comprise a hydrophilic modification thereon. Suitable hydrophilic monomers may include, but are not limited to, those listed above. In some embodiments, the hydrophilic monomers may be hydrophilically modified through a reaction with a polyether, for example. Suitable polyethers may include, for example, polyethylene oxide, polypropylene oxide, polybutylene oxide, and any combination thereof. In certain embodiments, hydrophilically modified hydrophilic polymers may comprise a copolymer of a hydrophilic polymer and a plurality of hydrophilically modified hydrophilic monomers. Suitable hydrophilic polymers may include, but are not limited to, those listed above.

As noted above, in certain embodiments, the relative permeability modifiers used in the present disclosure may comprise one or more hydrophobically modified hydrophilic polymers that further comprise a cationic modification, which may refer to the incorporation of at least one cationic group or a cationic forming group that comprises a short chain alkyl group, wherein the alkyl chain length is about 1 to about 3 carbons. In certain embodiments, the hydrophobically and cationically modified relative permeability modifiers may comprise a polymer backbone that comprises polar heteroatoms. Generally, the polar heteroatoms present within the polymer backbone of the hydrophobically and cationically modified relative permeability modifiers include, but are not limited to, oxygen, nitrogen, sulfur, or phosphorous.

In certain embodiments, hydrophilically modified hydrophilic polymers suitable for use in the present methods may have molecular weights ranging between about 100,000 to about 10,000,000, and the mole fraction of the hydrophilically modified monomer(s) may range from about 0.1% to about 50% of the hydrophilically modified hydrophilic polymer, or alternatively, from about 0.1% to about 10% of the hydrophobically modified hydrophilic polymer.

In certain embodiments, the relative permeability modifiers used in the methods and systems of the present disclosure are provided and/or introduced into at least a portion of a subterranean formation as a component of a treatment fluid that is pumped or injected therein. This treatment fluid may be the same treatment fluid carrying the particulate material, or the relative permeability modifier may be provided or introduced into the formation in a separate fluid. For example, the particulate material may be suspended in a first treatment fluid (without a significant amount of a relative permeability modifier) introduced into the formation and the relative permeability modifier may be introduced into the formation as a component of a second treatment fluid introduced into the formation thereafter. One of ordinary skill in the art with the benefit of this disclosure will be able to choose an appropriate concentration of relative permeability modifier to include in a treatment fluid in order to provide the desired degree of water control in a particular application based on, among other things, the size of the pore throats in an artificial rock matrix formed by the particulate material. In some embodiments, the relative permeability modifier may be present in the treatment fluid in an amount of from about 0.01% to about 20% by weight of the treatment fluid. In other embodiments, the relative permeability modifier may be present in the treatment fluid in an amount of from about 0.2% to about 2% by weight of the treatment fluid.

The treatment fluids used in the methods and systems of the present disclosure may comprise any base fluid known in the art, including aqueous base fluids, non-aqueous base fluids, and any combinations thereof. The term "base fluid" refers to the major component of the fluid (as opposed to components dissolved and/or suspended therein), and does not indicate any particular condition or property of that fluid such as its mass, amount, pH, etc. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to, oils, hydrocarbons, organic liquids, and the like. In certain embodiments, the fracturing fluids may comprise a mixture of one or more fluids and/or gases, including but not limited to emulsions, foams, and the like.

In certain embodiments, the treatment fluids used in the methods and systems of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, $H_2S$ scavengers, $CO_2$ scavengers, oxygen scavengers, lubricants, viscosifiers, breakers, weighting agents, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after a viscosifying agent has been at least partially hydrated in the fluid. In certain embodiments, the treatment fluid comprising the relative permeability modifier optionally may comprise a companion polymer (e.g., a polyacrylate, a polyacrylamide, an acrylate/acrylamide copolymer, an acrylamide/diallyldimethylammonium chloride copolymer, diutan, polyethylenimine, or any combination thereof) that may interact synergistically with the relative permeability modifier to further reduce its water permeability and/or increase the aqueous fluid injection pressure through the formation. A person skilled in the art, with the benefit of this disclosure, will recognize the types of additives that may be included in the fluids of the present disclosure for a particular application.

In the methods and systems of the present disclosure, the particulate material and/or the relative permeability modifier may be introduced into a subterranean formation. In certain embodiments, one or more treatment fluids comprising the particulate material and/or the relative permeability modifier may be introduced (e.g., pumped or injected) into a well bore that penetrates a subterranean formation, which may include a production well (e.g., a well through which hydrocarbons may be produced to the surface), an injection well, or any other type of well bore penetrating a subterranean formation. In certain embodiments, where the particulate material and/or relative permeability modifier are introduced into an injection well, the particulate material and/or relative permeability modifier may flow into the formation and may migrate to one or more fractures or voids in another area of the formation, e.g., adjacent to or near the injection well. For example, the particulate material and/or relative permeability modifier may be introduced or pumped into an injection well at a sufficient pressure to allow the relative permeability modifier to migrate to a fracture or void in a portion of the subterranean formation. In certain embodiments, one or more zonal isolation tools or fluid diversion tools may be used to selectively place the particulate material and/or relative permeability modifier in a selected zone or region in a formation (e.g., a highly permeable portion of a formation penetrated by a longer well bore). Such tools may comprise any equipment known in the art for those purposes, including but not limited to packers, plugs, pack-off devices, ball sealers, diverting agents, diverting fluids (e.g., foams, emulsions, gels, etc.), jetting equipment (e.g., hydrajetting tools), coiled tubing, ported-sub assemblies, pulsonic tools, and the like.

The present disclosure in certain embodiments provides methods for treating a region of a subterranean formation comprising one or more voids and/or fractures, including but not limited to cracks, fractures, wormholes, channels, and/or other open spaces lacking a significant rock matrix therein. Such voids and/or fractures may be naturally-occurring (e.g., cracks) in formations where stimulation treatments such as fracturing and/or acidizing have not been performed. Such voids and/or fractures may be particularly prevalent in certain types of rock formations, including but not limited to sandstone formations, carbonate formations, and the like. In other embodiments, such voids and/or fractures and/or may be created or enhanced (e.g., enlarged) in the course of one or more subterranean operations or treatments (either prior to or in the course of a treatment according to the present disclosure), including but not limited to, hydraulic fracturing treatments, acidizing treatments, and drilling operations.

In certain embodiments, the fractures and/or voids may have been created and/or enhanced in the course of one or more hydraulic fracturing treatments, for example, in which a treatment fluid is introduced at a pressure sufficient to create or enhance one or more fractures within the subterranean formation. In some embodiments, the fractures and/or voids may have been created and/or enhanced in the course of one or more acidizing treatments. In these embodiments, a treatment fluid further comprising an acid may be introduced at a pressure sufficient to cause at least a portion of the treatment fluid to penetrate at least a portion of the subterranean formation, and the treatment fluid may be allowed to interact with the subterranean formation so as to create one or more voids in the subterranean formation. In certain such embodiments, introduction of the acidic treatment fluid may be carried out at or above a pressure sufficient to create or enhance one or more fractures within the subterranean formation (e.g., fracture acidizing). In other embodiments, introduction of the treatment fluid may be carried out at a pressure below that which would create or enhance one or more fractures within the subterranean formation (e.g., matrix acidizing).

The present disclosure in some embodiments also provides methods for treating a region of a subterranean formation in which a matrix bypass event has occurred (or is believed to have occurred) or may occur. A "matrix bypass event" is a phenomenon wherein an injection well penetrating a subterranean formation at a location offset from a production well develops a channel or other direct pressure communication with a production well. Such phenomena may be evidenced by, among other things, a significant decrease in the difference in pressure between the bottom hole injection well pressure and the bottom hole production well pressure over a relatively short period of time, e.g., a change in differential on the order of at least 100 psi over a 12 hour time period. Such phenomena may create an unwanted influx of water from the injection well into the production well. In certain such embodiments, particulate material and/or a treatment fluid comprising a relative permeability modifier may be introduced into a region of the formation where the bypass event is detected and/or believed to have occurred via the injection well. The flow of water from the region of the injection well toward the production well may carry the particulate material and/or the relative permeability modifier into or toward a region of pressure communication. Once in place in the formation, the particulate material and relative permeability modifier may selectively divert, reduce, or prevent the flow of water from the injection well into the producing well while allowing other fluids (e.g., hydrocarbons or other treatment fluids) to flow therethrough.

In certain embodiments, the methods of the present disclosure optionally may include introducing into the formation a consolidating agent such as a curable resin after the particulate material and relative permeability modifier have been introduced into the formation. This consolidating agent may, among other things, consolidate and/or stabilize the particulate material in place in the fracture(s) and/or void(s) in the formation, thereby reducing or preventing unwanted migration and/or production of those particulates from their intended location. In these embodiments, the consolidating agent may comprise any such agent known in the art, including but not limited to resins, tackifying agents, gelable aqueous silicate compositions, crosslinkable polymer (or polymerizable monomer) compositions, and the like. In certain such embodiments, one or more well bores penetrating the subterranean formation may be shut in for a period of time (e.g., about 2 hours or more), among other reasons, to allow the consolidating agent to cure or harden in the formation.

The present disclosure in some embodiments also provides methods for treating a region of a subterranean formation in which a well bore is being drilled on a proactive basis. For example, when a well bore is being drilled in a formation in underbalanced conditions, it may be possible to detect or identify water-producing zones of the formation as the well bore is drilled through them. As used herein, the term "underbalanced conditions" may refer to drilling conditions wherein the pressure in the well bore is maintained at a level lower than the fluid pressure in the formation being drilled, which may allow formation fluids to flow up the well bore during the drilling process. In certain embodiments, when a water-producing zone is encountered during a drilling operation, the drilling process may be temporarily suspended (e.g., with the drillstring and/or other drilling equipment still in place, or by removing it from the well bore), and a treatment of the present disclosure may be performed at that time. In certain such embodiments, the particulate material and the relative permeability modifier may be introduced into one or more fractures and/or voids in the formation penetrated by the well bore, for example, using the same drillstring and/or coiled tubing being used to perform the drilling operations. Once the particulate material and relative permeability modifier have been placed, further drilling operations or completion operations may be conducted in that well bore, for example, to drill additional portions of the well bore downhole of the region penetrating the fractures or voids in the formation.

Certain embodiments of the methods and compositions disclosed herein may directly or indirectly affect one or more components or pieces of equipment associated with the preparation, delivery, recapture, recycling, reuse, and/or disposal of the disclosed compositions. For example, and with reference to FIGS. 1 through 3, the disclosed methods and compositions may directly or indirectly affect one or more components or pieces of equipment associated with an example of a well and treatment system, according to one or more embodiments. Referring now to FIG. 1, a well 60 is shown during an operation according to certain embodiments of the present disclosure in a portion of a subterranean formation of interest 102 surrounding a well bore 104. The well bore 104 extends from the surface 106 and through a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fluids and/or other materials to flow into the subterranean formation 102. In cased wells, perforations can be formed using shape charges, a perforating gun, hydro-jetting and/or other tools. As shown, the well bore 104 penetrates a portion of a fracture or void 116 in portion 102 of the subterranean formation, and the fracture or void 116 also communicates with a portion 105 of the formation that comprises water. In some cases, this communication between portion 105 and the well bore 104 may cause the production of water from the well 60.

Figure 2:
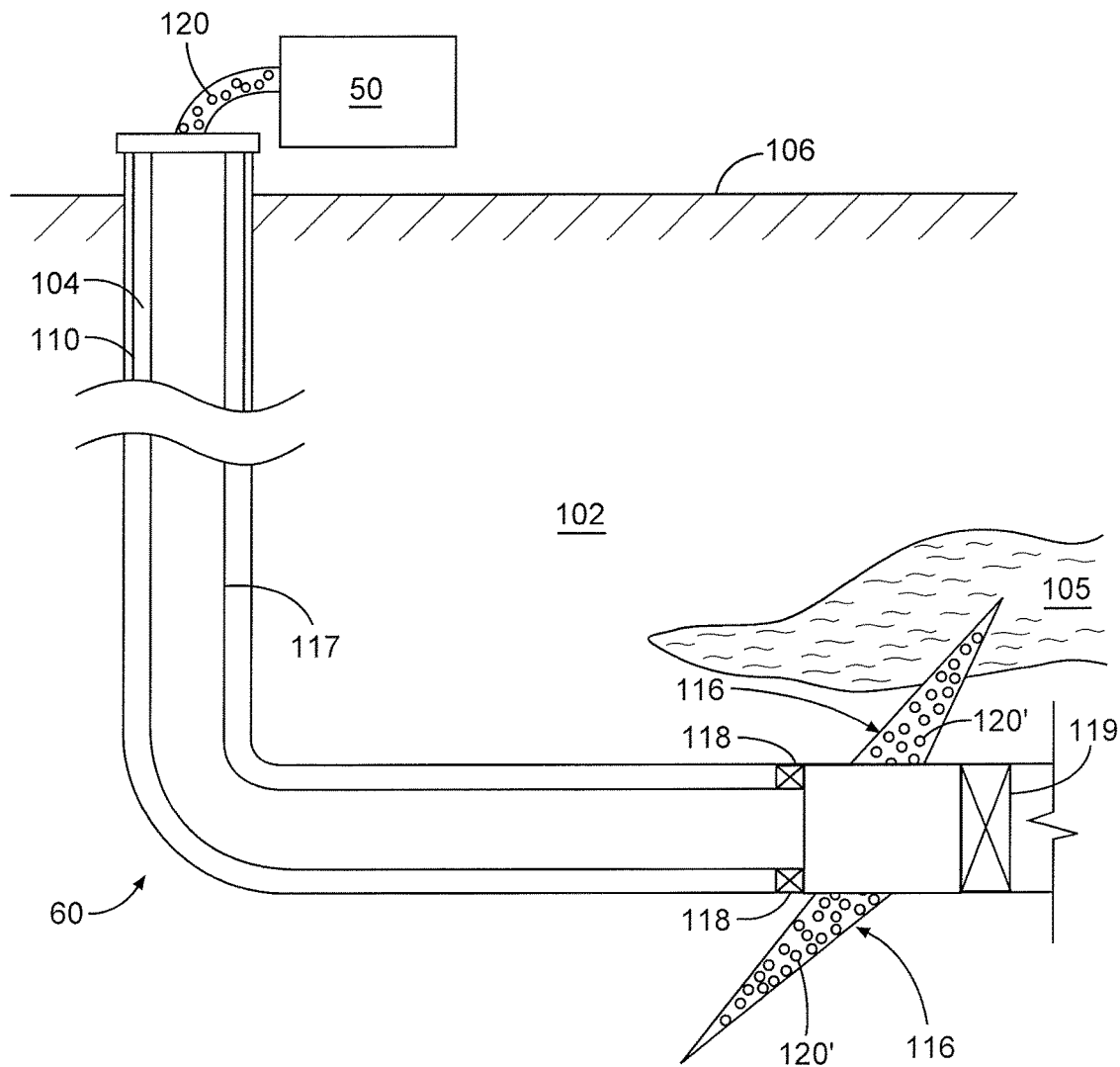
FIG. 2 is a diagram illustrating the performance of a first step of a method according to certain embodiments of the present disclosure at the well of FIG. 1.

Referring now to FIG. 2, a pump and blender system 50 is shown installed or residing at the surface at a well site where a well 60 is located. Pump and blender system 50 may be similar to certain types of equipment used for performing fracturing or other operations in a subterranean formation, and thus may comprise particulate material sources, fluid additives sources, and other similar components for preparing treatment fluids comprising the particulate material and/or the relative permeability modifier and introducing them into well 60. Notably, in certain instances, various components of the pump and blender system 50 may be equipped with one or more metering devices (not shown) to control the flow of fluids, particulates, additives and/or other compositions into the blender and/or the well bore. Such metering devices may permit the pumping and blender system 50 to source from one, some or all of the different sources at a given time, and may facilitate the preparation of treatment fluids in accordance with the present disclosure using continuous mixing or "on-the-fly" methods.

Still referring to FIG. 2, the well 60 is also shown with a work string 117 that extends from the surface 106 into the well bore 104. The pump and blender system 50 is coupled the work string 117 to pump particulate materials and/or treatment fluids into the well bore 104. The working string 117 may include coiled tubing, jointed pipe, and/or other structures that allow fluid to flow into the well bore 104. The working string 117 can include flow control devices, bypass valves, ports, and or other tools or well devices that control a flow of fluid from the interior of the working string 117 into the subterranean zone 102. For example, the working string 117 may include ports adjacent the well bore wall to communicate particulate materials and/or treatment fluids directly into the subterranean formation 102.

The working string 117 and/or the well bore 104 may include one or more sets of packers 118 and 119 that seal the annulus between the working string 117 and well bore 104 and/or a downhole portion of the well bore 104 to define an interval of the well bore 104 into which particulate materials and/or treatment fluids will be pumped. According to certain embodiments of the present disclosure, as shown in FIG. 2, particulate materials 120 (or a treatment fluid carrying such particulate) may be pumped through the working string 117, and a portion of those particulates 120' may be deposited in the fracture or void 116. In certain embodiments, this may form an artificial rock matrix that resides within the fracture or void 116. In certain embodiments, the treatment fluid carrying particulates 120 into the well bore 104 may be circulated back to the surface 106 and out of the well bore 104.

Figure 3:
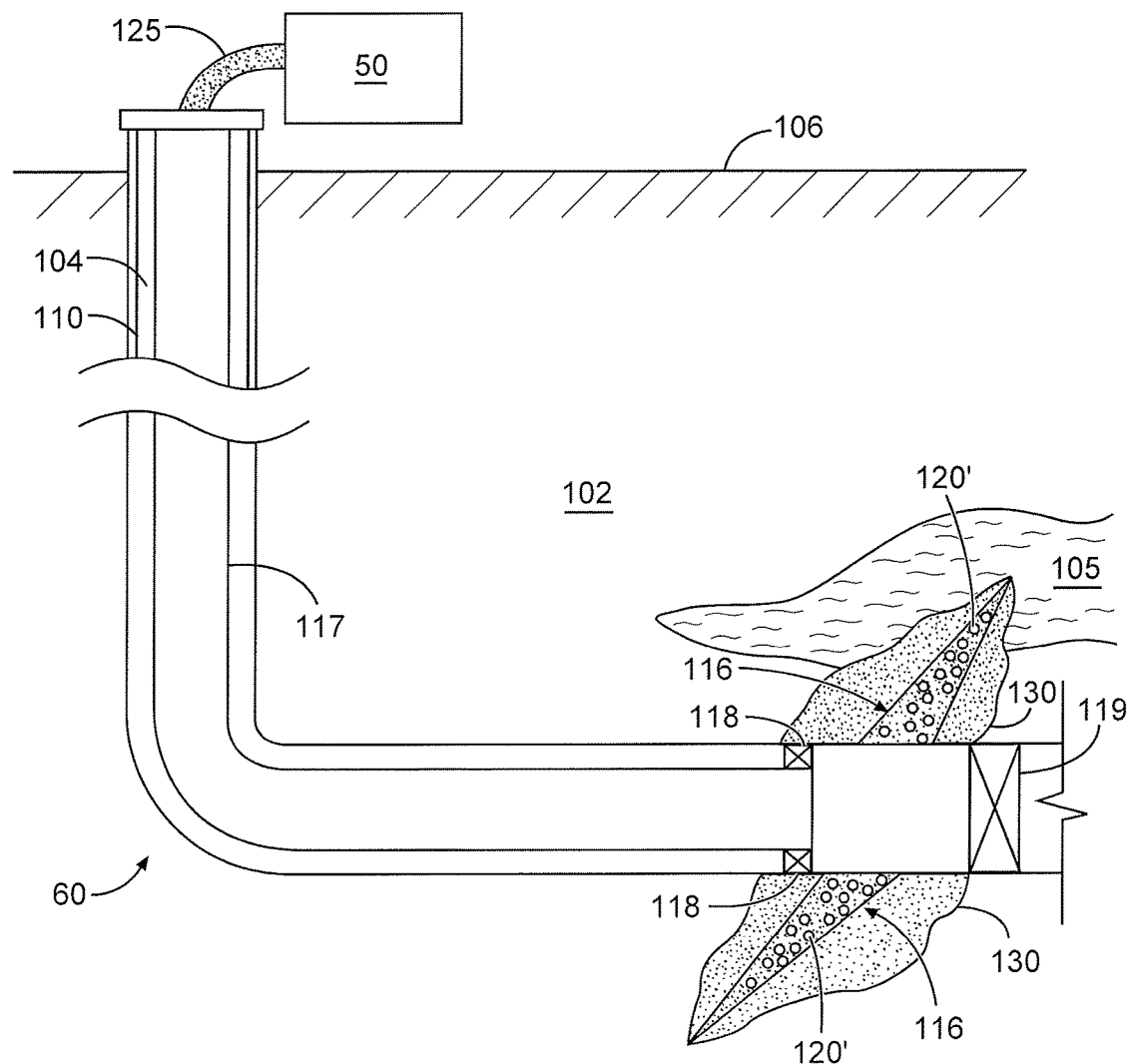
FIG. 3 is a diagram illustrating the performance of a second step of a method according to certain embodiments of the present disclosure at the well of FIG. 1.

Referring now to FIG. 3, after the particulates 120 and 120' have been pumped into the well bore 104, a treatment fluid comprising a relative permeability modifier 125 may be pumped through the working string 117 and directed into the region 130 of the formation that includes fracture or void 116. The relative permeability modifier may adsorb onto the surfaces of particulates 120' deposited in the fracture or void 116, as well as the naturally-occurring rock surfaces or particulates in the surrounding region 130. By adsorbing onto the particulates 120' and rock in region 130, the relative permeability modifier may alter the permeability of that region to water, thereby reducing or preventing the flow of water from portion 105 into the well bore 104 through the fracture or void 116.

While not specifically illustrated herein, the disclosed methods and compositions may also directly or indirectly affect any equipment used to convey the compositions to the treatment system shown in FIGS. 1 through 3, such as, for example, any conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

An embodiment of the present disclosure is a method comprising: introducing a particulate material into a portion of a subterranean formation comprising one or more fractures or voids; and introducing a treatment fluid comprising a relative permeability modifier into the portion of the subterranean formation such that the permeability of the particulate material in the portion of the subterranean formation to water is reduced.

Another embodiment of the present disclosure is a method comprising: providing a subterranean formation wherein a first well bore and an injection well offset from the first well bore penetrate portions of the subterranean formation; introducing a particulate material into the injection well; introducing a treatment fluid comprising a relative permeability modifier into the injection well; and depositing at least a portion of the particulate material and the relative permeability modifier in a portion of the subterranean formation penetrated by the injection well such that the permeability of the particulate material in the subterranean formation to water is reduced, and the flow of water from the injection well into or toward the first well is reduced.

Another embodiment of the present disclosure is a method comprising: drilling at least a first portion of a well bore to penetrate a portion of a subterranean formation that comprises one or more fractures or voids; introducing a particulate material into the portion of a subterranean formation comprising one or more fractures or voids; and introducing a treatment fluid comprising a relative permeability modifier into the portion of the subterranean formation such that the permeability of the particulate material in the portion of the subterranean formation to water is reduced.

Another embodiment of the present disclosure may include a method according to any of the preceding embodiments wherein the particulate material and the treatment fluid are introduced into a well bore penetrating the portion of the subterranean formation.

Another embodiment of the present disclosure may include a method according to any of the preceding embodiments wherein the particulate material and the treatment fluid are introduced into the well bore using a pump and blender system.

Another embodiment of the present disclosure may include a method according to any of the preceding embodiments further comprising allowing hydrocarbons to be produced out of the well bore.

Another embodiment of the present disclosure may include a method according to any of the preceding embodiments wherein the relative permeability modifier may be present in the treatment fluid in an amount of from about 0.2% to about 2% by weight of the treatment fluid.

Another embodiment of the present disclosure may include a method according to any of the preceding embodiments wherein the relative permeability modifier comprises at least one hydrophobically modified hydrophilic polymer.

Another embodiment of the present disclosure may include a method according to any of the preceding embodiments wherein the particulate material comprises one or more clays.

Another embodiment of the present disclosure may include a method according to any of the preceding embodiments wherein the particulate material comprises a mixture of sand and clay.

Another embodiment of the present disclosure may include a method according to any of the preceding embodiments further comprising introducing a consolidating agent into at least the portion of the subterranean formation.

Another embodiment of the present disclosure may include a method according to any of the preceding embodiments wherein the consolidating agent comprises at least one agent selected from the group consisting of: a resin, a tackifying agent, a gelable aqueous silicate composition, a crosslinkable polymer composition, a crosslinkable polymerizable monomer composition, and any combination thereof.

Another embodiment of the present disclosure may include a method according to any of the preceding embodiments further comprising: depositing at least a portion of the particulate material in at least one of the fractures or voids in the formation to form an artificial rock matrix within the fracture or void; and contacting the artificial rock matrix with the treatment fluid comprising the relative permeability modifier such that the permeability of the artificial rock matrix to water is reduced.

Another embodiment of the present disclosure may include a method according to any of the preceding embodiments further comprising: contacting the artificial rock matrix with a consolidating agent; and allowing the consolidating agent to consolidate at least a portion of the particulate material in the artificial rock matrix.

Another embodiment of the present disclosure may include a method according to any of the preceding embodiments wherein drilling at least the first portion of the well bore to penetrate the portion of the subterranean formation further comprises drilling in underbalanced conditions.

Another embodiment of the present disclosure may include a method according to any of the preceding embodiments further comprising drilling a second portion of the well bore downhole of the first portion of the well bore after the treatment fluid comprising the relative permeability modifier is introduced into the portion of the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
providing a subterranean formation wherein a first well bore and an injection well offset from the first well bore penetrate portions of the subterranean formation;
detecting a portion of the subterranean formation penetrated by the injection well that is in pressure communication with the first well bore based at least in part on a decrease in a difference in pressure between a bottom hole pressure of the injection well and a bottom hole pressure of the first well bore;
introducing a particulate material into the injection well;
introducing a treatment fluid comprising a relative permeability modifier into the injection well at a pressure insufficient to enhance or create fractures or voids in the subterranean formation, wherein the relative permeability modifier comprises at least one hydrophilic polymer;
depositing at least a portion of the particulate material and the relative permeability modifier in the portion of the subterranean formation penetrated by the injection well that is in pressure communication with the first well bore, wherein the relative permeability modifier at least partially adsorbs onto at least a portion of the particulate material such that the permeability of the particulate material to water is reduced and the flow of water from the injection well into or toward the first well bore through the portion of the subterranean formation is reduced.

2. The method of claim 1 further comprising:
depositing at least a portion of the particulate material in at least one fracture or void in the subterranean formation to form an artificial rock matrix within the fracture or void; and
contacting the artificial rock matrix with the treatment fluid comprising the relative permeability modifier such that the permeability of the artificial rock matrix to water is reduced.

3. The method of claim 2 further comprising:
contacting the artificial rock matrix with a consolidating agent; and
allowing the consolidating agent to consolidate at least a portion of the particulate material in the artificial rock matrix.

4. The method of claim 1 wherein the particulate material comprises a mixture of sand and clay.

5. The method of claim 1 wherein the particulate material comprises sand.

6. The method of claim 1 wherein the particulate material comprises clay.

7. The method of claim 1 wherein the particulate material and the treatment fluid are introduced into the injection well using a pump and blender system.

8. The method of claim 1 further comprising allowing hydrocarbons to be produced out of the first well bore.

9. The method of claim 1 wherein the relative permeability modifier may be present in the treatment fluid in an amount of from about 0.2% to about 2% by weight of the treatment fluid.

10. The method of claim 1 wherein the hydrophilic polymer is a hydrophobically modified hydrophilic polymer.

11. The method of claim 1 further comprising introducing a consolidating agent into at least the portion of the subterranean formation.

12. The method of claim 11 wherein the consolidating agent comprises at least one agent selected from the group consisting of: a resin, a tackifying agent, a gelable aqueous silicate composition, a crosslinkable polymer composition, a crosslinkable polymerizable monomer composition, and any combination thereof.

* * * * *